United States Patent
Burke

(10) Patent No.: US 6,869,261 B2
(45) Date of Patent: Mar. 22, 2005

(54) TRANSPORTATION AND INSTALLATION ASSIST DEVICE FOR AT LEAST ONE PRECAST CONCRETE TILT PANEL

(76) Inventor: John T. Burke, P.O. Box 330, East Maitland, New South Wales (AU), 2323

( * ) Notice: Subject to any disclaimer, the term of this patent is extended or adjusted under 35 U.S.C. 154(b) by 28 days.

(21) Appl. No.: 10/296,090

(22) PCT Filed: May 28, 2001

(86) PCT No.: PCT/AU01/00629
§ 371 (c)(1),
(2), (4) Date: May 14, 2003

(87) PCT Pub. No.: WO01/92056
PCT Pub. Date: Dec. 6, 2001

(65) Prior Publication Data
US 2003/0170109 A1 Sep. 11, 2003

(30) Foreign Application Priority Data
May 29, 2000 (AU) .............................................. PQ7787

(51) Int. Cl.[7] .................................................. B60P 1/04
(52) U.S. Cl. ............................ 414/11; 414/399; 410/32; 410/35
(58) Field of Search .......................... 414/11, 24.5, 391, 414/399, 469, 584, 608, 639, 643, 660, 668, 671, 789.7; 52/125.6; 211/169.1; 410/32, 35

(56) References Cited

U.S. PATENT DOCUMENTS

| | | | | |
|---|---|---|---|---|
| 1,519,319 A | * | 12/1924 | Manning | 410/2 |
| 2,725,241 A | * | 11/1955 | Leonard | 410/44 |
| 3,330,424 A | * | 7/1967 | Grey et al. | 414/789.3 |
| 3,655,218 A | * | 4/1972 | Taylor | 410/44 |
| 3,687,300 A | * | 8/1972 | Andersson | 414/783 |
| 3,765,543 A | * | 10/1973 | Thomas | 414/11 |
| 3,765,550 A | * | 10/1973 | Tausheck | 414/541 |
| 4,481,743 A | * | 11/1984 | Jellen | 52/64 |
| 4,496,277 A | * | 1/1985 | Jungman | 414/589 |
| 4,531,720 A | * | 7/1985 | Soder | 269/71 |
| 4,676,713 A | * | 6/1987 | Voelpel | 414/590 |
| 5,042,222 A | * | 8/1991 | Guthrie | 52/749.1 |
| 5,333,981 A | * | 8/1994 | Pronovost et al. | 414/24.5 |
| 5,427,495 A | * | 6/1995 | Vlaanderen | 414/498 |
| 5,551,831 A | * | 9/1996 | Corbett | 414/814 |
| 5,690,461 A | * | 11/1997 | Tilley | 414/111 |
| 5,921,738 A | * | 7/1999 | Rempel | 414/111 |
| 5,947,665 A | * | 9/1999 | Baur et al. | 410/44 |
| 6,341,788 B1 | * | 1/2002 | Ciccone | 280/47.28 |
| 6,592,319 B2 | * | 7/2003 | Berger | 414/522 |

FOREIGN PATENT DOCUMENTS

| | | |
|---|---|---|
| JP | 6-219205 A | 8/1994 |
| SU | 592639 A1 | 2/1978 |
| SU | 1791197 A1 | 1/1993 |

* cited by examiner

*Primary Examiner*—Douglas Hess
(74) *Attorney, Agent, or Firm*—Townsend and Townsend and Crew LLP

(57) ABSTRACT

A transportation and installation assist device (16) for at least one precast concrete tilt panel. The panel(s) (18) are generally rectangular and have a first shorter end (44) with at least one lifting anchor therein, a second opposed shorter end (48) and a longitudinal axis (50) therebetween. The device (16) includes at least one frame (20) adapted to releasably engage an associated one of the panel(s) (18) substantially adjacent the second end (48) and support the panel (18) in a loading/transport orientation with the face of the associated panel (18) substantially vertical and the axis(es) (50) substantially horizontal. The frame (20) is also adapted for pivotal mounting to a table bed (14) of a truck (10) or trailer (12). The frame (20) and associated panel (18) pivot together when the first panel end (44) is lifted above the second panel end (48) until the associated panel (18) is in a releasing orientation with the face of the panel (18) substantially vertical and the axis (50) substantially vertical. Further lifting of the first panel end (44) releases the panel (18) from the frame (20).

21 Claims, 6 Drawing Sheets

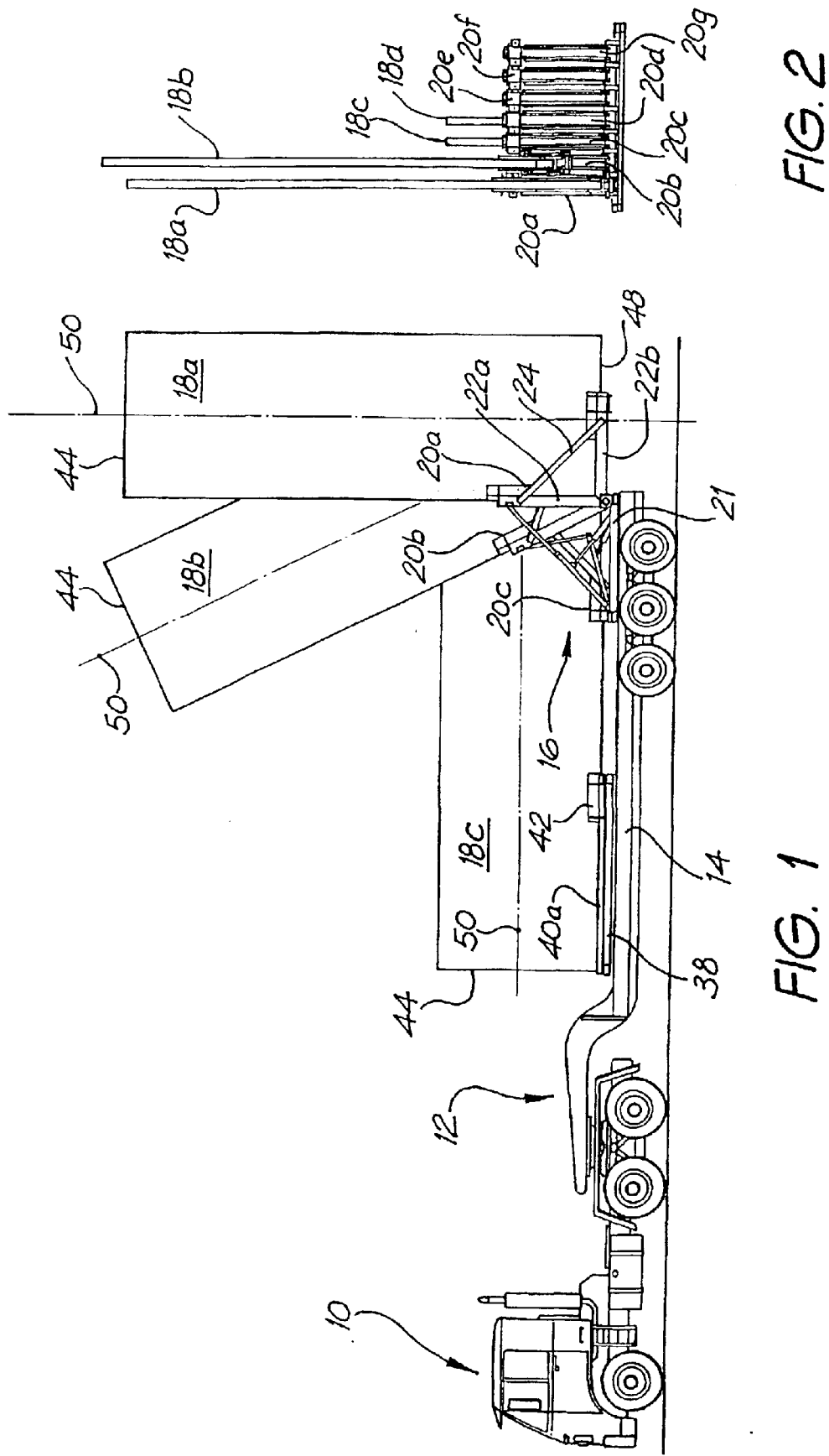

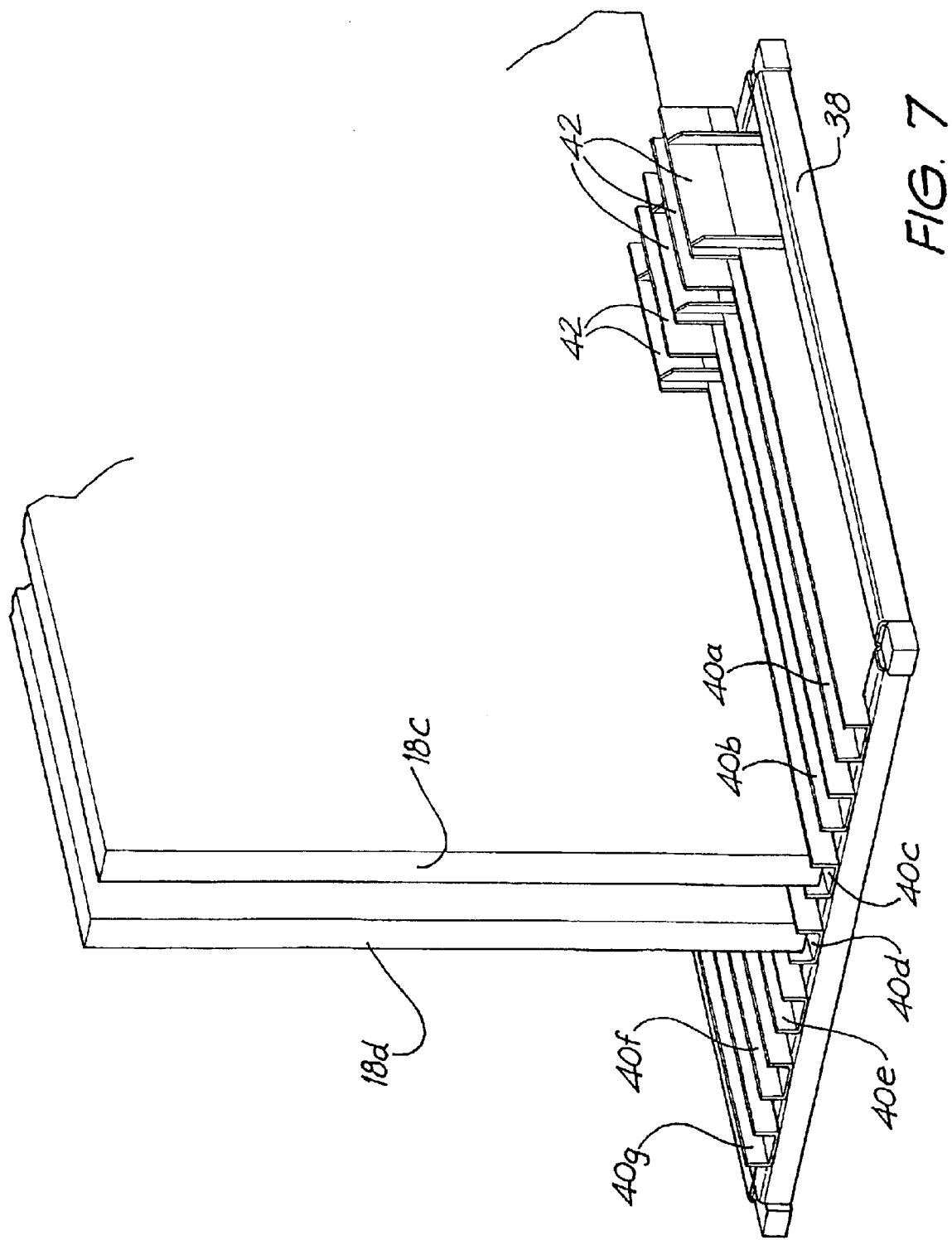

US 6,869,261 B2

TRANSPORTATION AND INSTALLATION ASSIST DEVICE FOR AT LEAST ONE PRE-CAST CONCRETE TILT PANEL

FIELD OF THE INVENTION

The present invention relates to a transportation and installation assist device for at least one pre-cast concrete tilt panel and has been primarily developed for use in conveying large pre-cast concrete tilt panels from a factory manufacturing site to an installation site.

BACKGROUND OF THE INVENTION

Buildings constructed from concrete panels fall broadly into two categories, namely those constructed using tilt-up concrete panels and those using pre-cast concrete panels.

Tilt-up concrete panels are cast on site, usually on the concrete slab which will eventually form the floor of the finished building. The panels are formed individually, often being stacked cast when the dimensions of individual panels permit. The organization of this process requires much planning as the cast must reflect the appropriate lifting order of the panels. The casting of panels on site is a labor-intensive endeavor and is subject to usual on-site problems. Once cured, the panels are lifted into place by use of a crane which is attached to lifting anchors cast into the panels. The panels are lifted from their horizontal as cast position to their final vertical position and during this process the stresses induced in the panel are often those governing the extent of reinforcement required in the panel.

Pre-cast concrete panels, by comparison, eliminate many of these on-site problems by casting individual panels in a factory environment. Once cured, the panels are rotated on a casting bed through 90° from the horizontal position so the panel is lying along its major axis. An overhead crane then lifts the panel from its casting bed, using lifting anchors cast into the panel, and places the panel onto a flat-bed truck for transport to site. On site, a crane is used to lift the panel into position as a part of a wall of a building. The size of pre-cast panels is restricted by transport requirements and, as such, they are usually a lot smaller than tilt-up panels cast on site and are generally not large enough to support a roof structure. From the above it can be seen that larger panels are normally cast on site as they are too large and heavy to transport, while smaller panels are pre-cast and then transported to site and erected. It would be economically advantageous to be able to precast larger panels. However, to lift a large panel from a transport truck, the panel has to be spun from its transporting position (lying on one long side) to its installation position (standing vertical). One known way of achieving this is to use a crane with a complicated spinning rig. Another method is to use two cranes. Both methods are time consuming, expensive and can be dangerous to operators.

OBJECT OF THE INVENTION

It is an object of the present invention to overcome or substantially ameliorate the above disadvantages.

SUMMARY OF THE INVENTION

Accordingly, in a first aspect, the present invention provides a transportation and; installation assist device for at least one precast concrete tilt panel, said panel(s) being generally rectangular and having a first shorter end with at least one lifting anchor therein, a second opposed shorter end and a longitudinal axis therebetween, said device including at least one frame adapted to releasably engage an associated one of said panel(s) substantially adjacent said second end and support said panel in a loading/transport orientation with the face of said associated panel substantially vertical and said axis substantially horizontal, said frame being adapted for pivotal mounting to a table bed of a truck or trailer, wherein said frame(s) and said associated panel(s) pivot together when the first panel end is lifted above the second panel end until said associated panel is in a releasing orientation with the face of said panel substantially vertical and said axis substantially vertical whereafter further lifting of said first panel end releases said panel from said frame.

In a second aspect, the present invention provides a truck or trailer table bed adapted for transportation and installation assisting of at least one concrete panel, said panel(s) being generally rectangular and having a first shorter end with at least one lifting anchor therein, a second opposed shorter end and a longitudinal axis therebetween, said table bed including at least one frame adapted to releasably engage an associated one of said panel(s) substantially adjacent said second end and support said panel in an orientation with the face of said associated panel substantially vertical and said axis substantially horizontal, said frame being pivotally mounted to said table bed, wherein said frame(s) and said associated panel(s) pivot together when the first panel end is lifted above the second panel end until said associated panel is in an orientation with the face of said panel substantially vertical and said axis substantially vertical whereafter further lifting of said first panel end releases said panel from said frame.

The device preferably further includes a plurality of said frames.

The frame(s) preferably include first and second right angled arms each adapted to respectively engage a portion of the second end and an adjacent longer end, wherein said frame(s) is/are pivotally mounted to the table bed adjacent the join of the pair of arms.

The first and second arms are desirably generally I-shaped in cross-section.

The device preferably further includes at least one support bracket adapted for mounting to the table bed in a position able to engage the first end of an associated panel in the loading/transport orientation.

The frame(s) desirably pivot about a shaft adapted for mounting to the table bed.

In one form, the frame(s) is/are directly pivotally mounted to the table bed and the bracket(s) is/are directly mounted to the table bed.

In another form, the frame(s) is/are directly pivotally mounted to a first base structure, the first base structure being fixed to the rearward end of the table bed and the bracket(s) is/are directly mounted to a second base structure, the second base structure being fixed to the frontward end of the table bed.

BRIEF DESCRIPTION OF THE DRAWINGS

A preferred embodiment of the present invention will now be described, by way of example only, with reference to the accompanying drawings in which:

FIG. 1 is a schematic side view of a prime-mover and trailer with an embodiment of a transportation and installation assist device according to the invention mounted thereto;

FIG. 2 is a rear end view of the device shown in FIG. 1;

FIG. 7 is a rear upper enlarged detailed view of the bracket of the device shown in FIG. 1.

DESCRIPTION OF THE PREFERRED EMBODIMENTS

Figure 3:
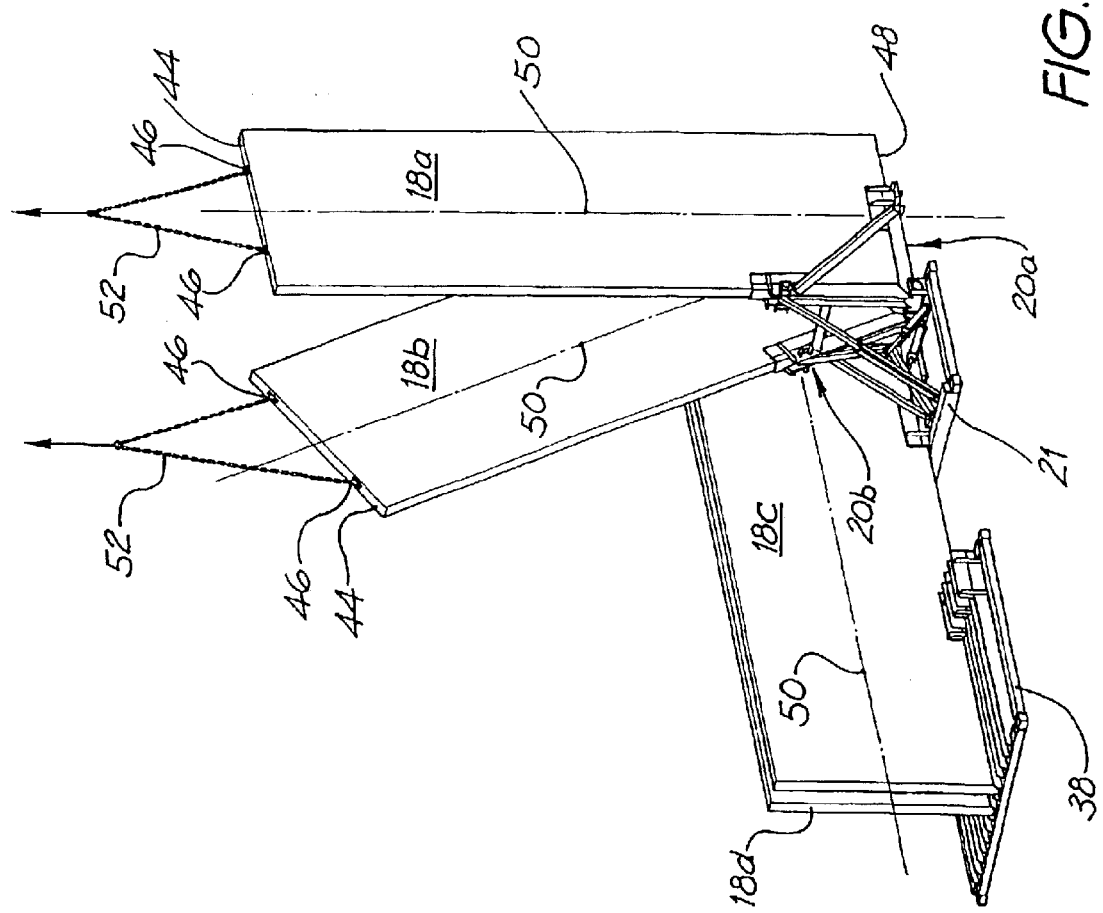
FIG. 3 is an enlarged front upper perspective view of the device shown in FIG. 1.
Figure 4:
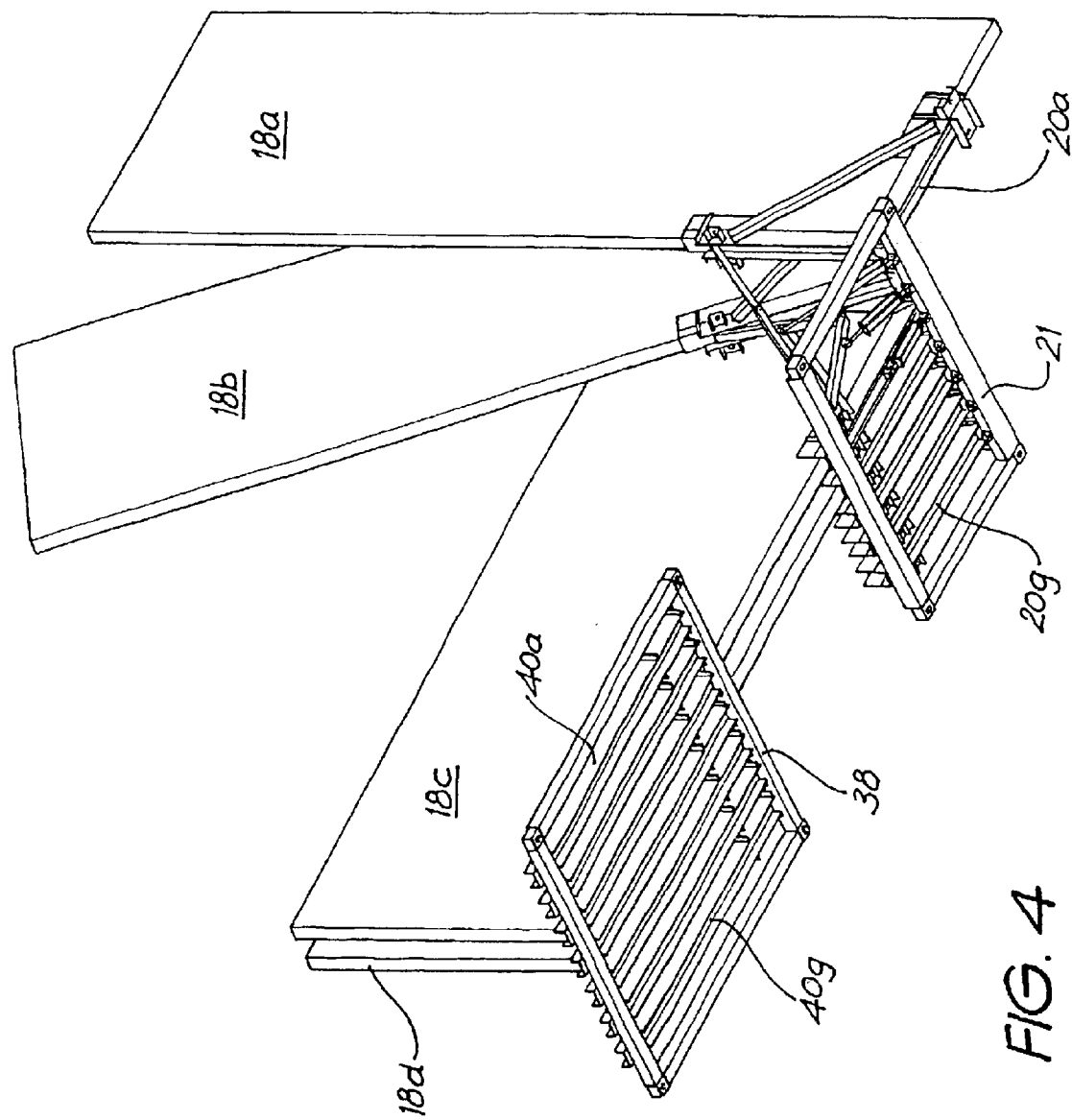
FIG. 4 is an enlarged front lower perspective view of the device shown in FIG. 1.
Figure 5:
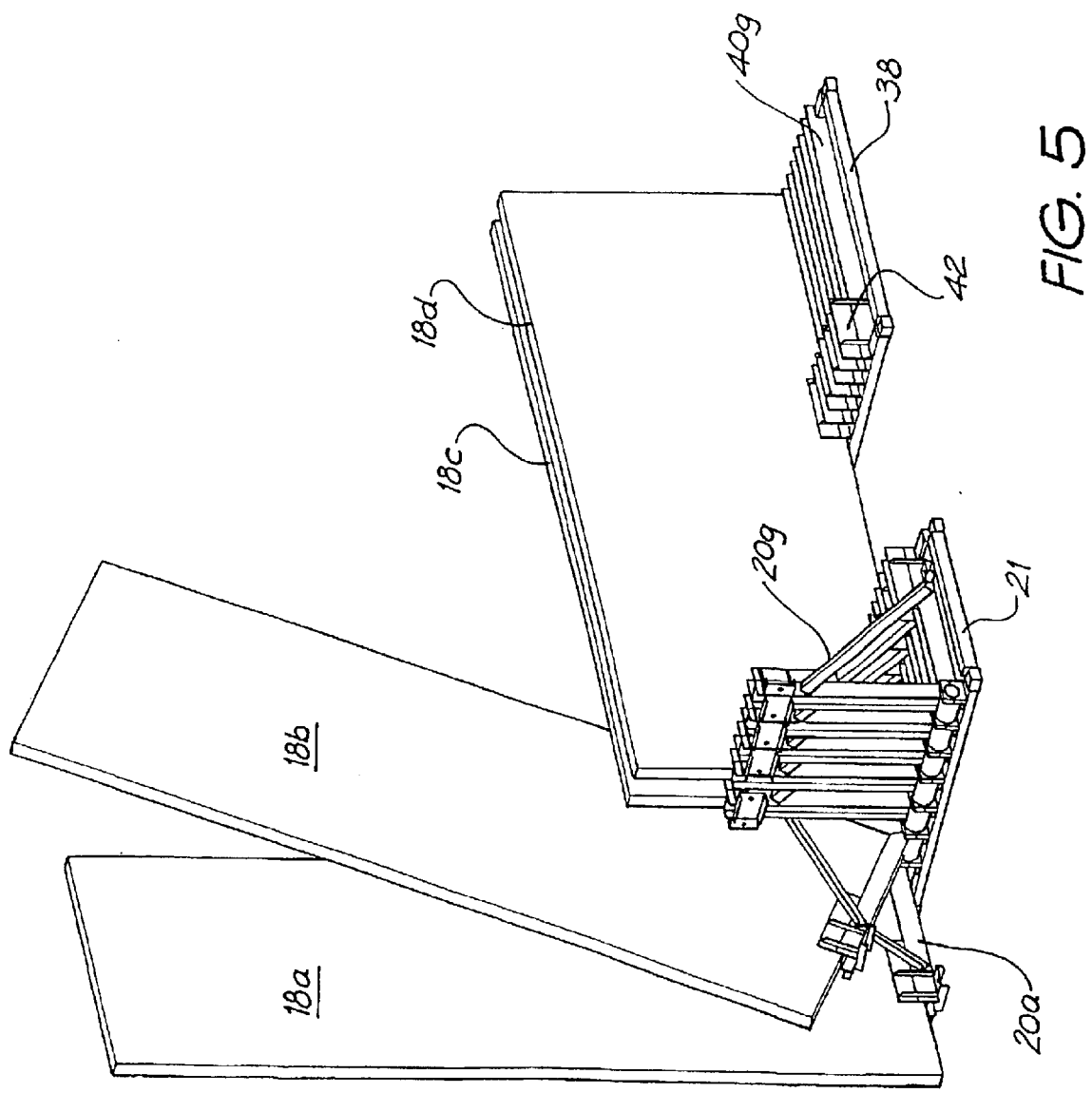
FIG. 5 is a rear upper perspective view of the device shown in FIG. 1.

Referring to the drawings, firstly FIGS. 1 and 2, there is shown a prime mover 10 attached to a trailer 12 with a table bed 14. An embodiment of a transportation and installation assist device, indicated generally by the reference numeral 16, is mounted to the table bed 14. The device 16 is used to assist in the transportation and installation of up to seven pre-cast concrete panels 18, of which four are shown in the drawings, namely 18a to 18d.

The device 16 has seven frames 20a to 20g which are each pivotally mounted to a rearward base platform 21 which is itself fixed to the trailer bed 14. In an alternative embodiment (not shown), the frames 20a to 20g are directly pivotally mounted to the trailer bed 14. Each frame 20a to 20g is comprised of first 22a and second 22b right angled arms formed from welded steel columns, preferably those designated 200UC. A cross brace 24, preferably made from an angled steel section, is welded between the distal ends of the arms 22a, 22b.

Figure 6:
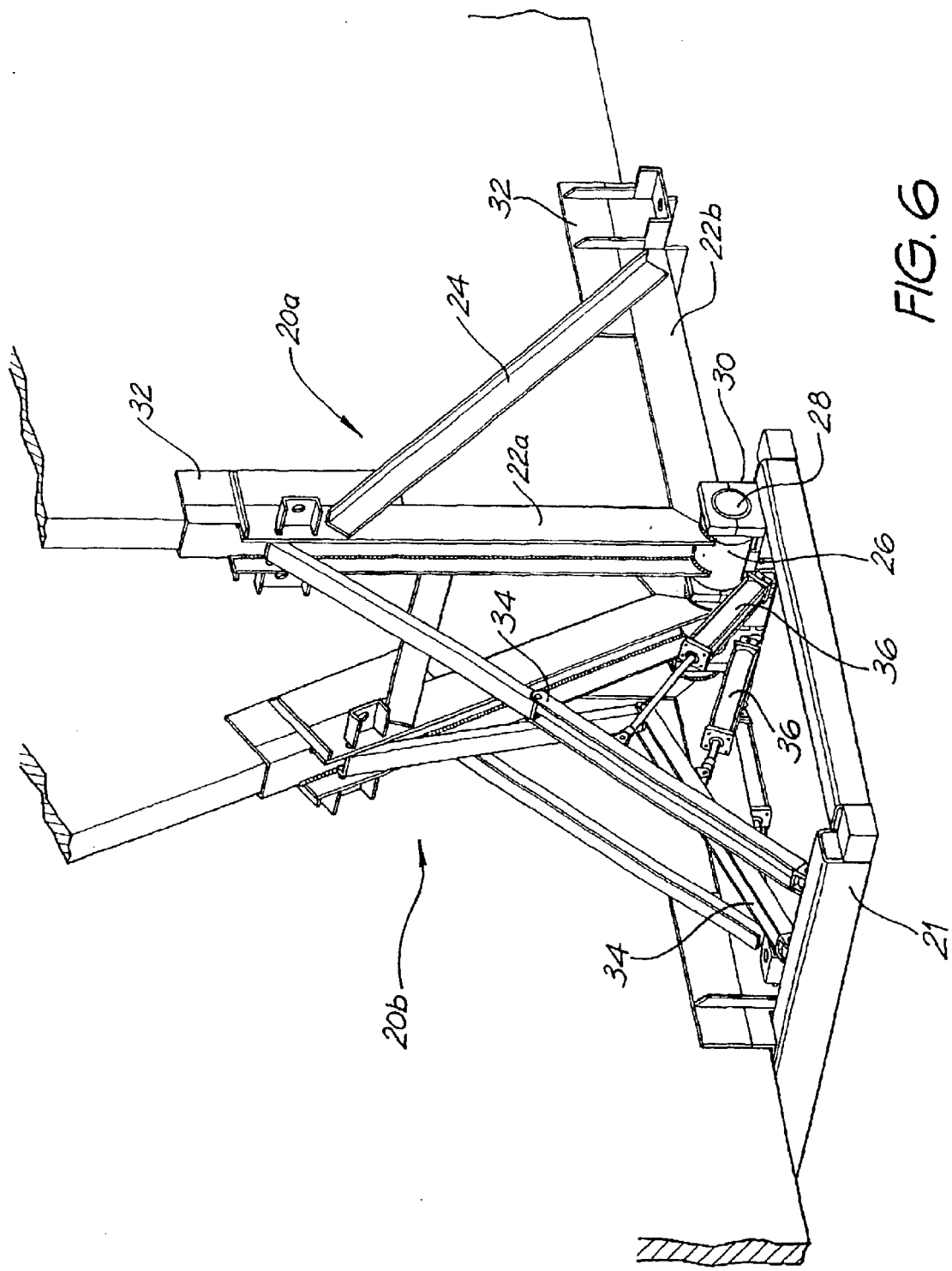
FIG. 6 is an enlarged front upper perspective view of the frame of the device shown in FIG. 1.

As best seen in FIG. 6, the arms 22a, 22b are welded to a cylindrical portion 26 which pivots about a shaft 28. The shaft 28 is located by bearing blocks 30 attached to the rearward base structure 21. The distal ends of each of the arms 22a, 22b also include welded extension pieces 32 formed from steel plate.

An optional hinged support 34 is pivotally connected at each end between the underside of each of the frames 20 and the end of the support structure 22 remote the shaft 28. A two-way pneumatic cylinder 36 is pivotally connected between each of the supports 34 and the platform 22.

The device 16 also includes a forward base support 38 to which are mounted seven support brackets 40a to 40g, also formed from 200UC. Each of the brackets 40a to 40g is respectively longitudinally aligned with each of the frames 20a to 20g. The rearward ends of the brackets 40a to 40g also include welded extension pieces 42 similar to the pieces 32 provided on the frame arms 22a, 22b. In an alternative embodiment (not shown), the brackets 40a to 40g are directly mounted to the trailer bed 14.

The panels 18c to 18d are generally rectangular and have a first shorter end 44 with a pair of lifting anchors 46 cast therein (see FIG. 3). A second shorter end 48 opposes the first shorter end 44 and a longitudinal axis 50 extends therebetween.

The frames 20 are able to pivot about the shaft 28 between a loading/transport orientation in which the first arm 22a of the frame is substantially horizontal and the second arm 22b of the frame is substantially vertical (see frames 20c to g in FIG. 2) and a releasing orientation in which the first arm 22a of the frame is substantially vertical and the second arm 22b of the frame is substantially horizontal (see frame 20a of FIG. 2).

The operation of the device 16 will now be described. Before loading the concrete panels 18 into the device 16, the frames 20 are all initially placed in the loading/transport orientation. A workshop crane is then used to lower the panels 18 into the frames/brackets 20/40 in the loading/transport orientation with the faces of the panels 18 being substantially vertical and the axes 50 being substantially horizontal (see panels 18c and 18d). Load straps are then placed around the panels 18 to assist in retaining them adjacent the frames/brackets 20/40 in this orientation during transportation. The extension pieces 32/42 also assist in locating and retaining the panels 18 adjacent the frames/brackets 20/40, in particular during any flexure of the trailer bed 14. Once at site, the lifting anchors 46 are attached to a crane (not shown) by a chain 52 (see FIG. 3) and the crane is used to raise the first end 44 of one of the concrete panels 18 above its second end 48. This causes the panel 18 to tilt and pivot about the shaft 28 (see panel 18b of FIG. 3) until the panel 18 is pivoted to a releasing orientation in which the axis 50 is substantially vertical (see panel 18a of FIG. 3). Further lifting of the panel 18 causes it to release from the frame 20 whereafter it can be maneuvered by the crane into the desired construction position.

If the optional hinged support 34 is used, then the cylinder 36 can be energized to drive the frames 20 between the two orientations described above before or after loading or releasing. Further, venting the air in the cylinder 36 through a suitable restriction during tilting of the panel 18 has a desirable dampening/shock absorbing effect on the panel movement.

The invention provides a relatively quick, safe and cost effective device that allows large pre-cast tilt panels to be transported and then maneuvered for installation on a building site. The invention also obviates the expense of maintaining site costs during construction of tilt-up panels. The invention also allows use of precast panels large enough to support a roof structure.

Although the invention has been described with reference to specific examples, it will be appreciated by those skilled in the art that the invention may be embodied in many other forms. For example, the frames 20, brackets 40 and extension pieces 32/42 can be modified to provide a clamping effect to suit panels 18 of varying thicknesses. Also, a hinged support leg can be added to the distal end of the arm 22b which swings into contact with the ground when the frame 20 is in the releasing orientation to present excessive rotation of the frame 20.

What is claimed is:

1. Apparatus for transporting and assisting in the tilt-up erection of a generally rectangular, pre-cast concrete panel for a building, the panel having opposing faces, surrounded by spaced-apart, relatively long sides and spaced-apart, relatively short first and second ends adjoining the sides and a longitudinal axis that is parallel to the sides, the apparatus comprising a base adapted to be mounted to a vehicle, a frame formed to releasably engage and support the panel adjacent the first end so that the faces are substantially upright, the longitudinal axis is substantially horizontal, and the panel can be removed from the frame by moving it in a direction substantially parallel to the faces, and a connection between the base and the frame permitting tilting movements of the frame relative to the base about a tilt axis that is substantially perpendicular to the faces of the panel so that the second end of the panel can be raised relative to the first end and the base into an upright installation orientation in which the faces and the longitudinal axis are substantially vertical while the panel remains supported by the frame.

2. Apparatus according to claim 1 including a plurality of frames.

3. Apparatus according to claim 1 wherein the frame includes first and second right-angled arms adapted to respectively engage a portion of the second end and a portion of one of the long sides adjacent the second end, and including a pivot connection between the frame and the base proximate the right-angled arms.

4. Apparatus according to claim 3 wherein the first and second arms have a generally I-shaped cross-section.

5. Apparatus according to claim 1 including a support bracket adapted to be mounted to the vehicle for engaging the first end of the panel when the longitudinal axis of the panel is substantially horizontal.

6. Apparatus according to claim 5 wherein the support bracket is adapted to be mounted directly to the vehicle.

7. Apparatus according to claim 5 including a base structure adapted to be fixed to a forward portion of the vehicle, and wherein the support bracket is carried by the base structure.

8. Apparatus according to claim 1 including a pivot shaft for the tilting movements of the frame relative to the base.

9. Apparatus for transporting building panels to and for tilt-up erecting the panels at a building site comprising a transport vehicle having a table bed, a frame carried by the table bed for receiving at least one tilt-up concrete panel having spaced-apart opposing faces, spaced-apart sides, spaced-apart first and second ends, and a longitudinal axis parallel to the sides, the frame being formed to withdrawably support the at least one panel adjacent the first end so that the faces are substantially upright and the axis is substantially horizontal, and a pivot connection between the frame and the bed permitting pivotal movements of the frame, and therewith of the panel carried by the frame, about a substantially horizontal axis that is substantially perpendicular to the faces of the panel so that, upon lifting the second end of the panel relative to the bed, the frame and therewith the panel carried by the frame pivotally move about the pivot axis towards a position in which the longitudinal axis of the panel and the faces are substantially vertical while the panel remains releasably supported by the frame adjacent the first end.

10. Apparatus according to claim 9 including a plurality of frames arranged side-by-side on the table bed.

11. Apparatus according to claim 9 wherein the frame includes first and second right-angled arms for respectively engaging a portion of the second end and a portion of one of the long sides adjacent the second end, and wherein the pivot connection is proximate ends of the first and second arms.

12. Apparatus according to claim 11 wherein the first and second arms have a generally I-shaped cross-section.

13. Apparatus according to claim 12 including a support bracket slidably mounted to the table bed in a position for engaging the first end of the panel when the longitudinal axis is substantially horizontal.

14. Apparatus according to claim 13 wherein the brackets are directly mounted to the table bed.

15. Apparatus according to claim 9 wherein the pivot connection includes a shaft mounted on the table bed.

16. Apparatus according to claim 9 wherein the pivot connection is directly mounted to the table bed.

17. Apparatus according to claim 9 including a base fixed to a rearward end of the table bed, and wherein the pivot connection is mounted on the base.

18. Apparatus according to claim 17 including a base fixed to a front portion of the table bed, and wherein the brackets are mounted to the base.

19. Apparatus according to claim 9 wherein the pivot connection is located proximate a rearward end of the table bed.

20. A method for transporting at least one substantially flat tilt-up concrete building panel to a building site and for assisting in the erection of the panel at the building site comprising providing a concrete panel having spaced-apart, relatively long sides, spaced-apart relatively short first and second ends, and spaced-apart faces bounded by the sides and ends of the panel, the panel including a lifting anchor proximate the second side, during transporting the panel supporting one of the edges in a substantially horizontal orientation adjacent the first end with a frame on a load carrying surface of the vehicle so that the faces are substantially vertical, at the site raising the second end of the panel with the lifting anchor relative to the first end while continuing to support the side adjacent the first end with the frame until the long sides of the panel approach the vertical, and thereafter lifting the panel in a substantially vertical direction from the frame.

21. A method according to claim 20 wherein raising the second end comprises pivoting the frame and therewith the panel about a substantially horizontal axis proximate the first end.

* * * * *